UNITED STATES PATENT OFFICE.

IGNAZ ROSENBERG AND BRUNO HELMERT, OF BIEBRICH, GERMANY, ASSIGNORS TO KALLE & CO., OF SAME PLACE.

REDDISH-BROWN POLYAZO DYE.

SPECIFICATION forming part of Letters Patent No. 613,644, dated November 1, 1898.

Application filed December 27, 1897. Serial No. 663,477. (No specimens.)

*To all whom it may concern:*

Be it known that we, IGNAZ ROSENBERG, a subject of the Emperor of Austria-Hungary, and BRUNO HELMERT, a subject of the King of Prussia, Emperor of Germany, doctors of philosophy, residing at Biebrich-on-the-Rhine, Germany, and assignors to KALLE & CO., of same place, have invented certain new and useful Improvements in the Manufacture of Reddish-Brown Polyazo Dyestuffs, (for which we have obtained Letters Patent in France, No. 265,227, dated March 22, 1897,) of which the following is a specification.

In our application for United States Letters Patent, Serial No. 663,476, filed December 27, 1897, a process of manufacturing new polyazo dyestuffs is described, which dye unmordanted cotton from baths prepared with alkali or salt shades fast to washing. If in the example of the specification of the said patent the diazo-benzene is replaced by the diazo compound of alpha-naphthylamin, a dyestuff of high value is produced. In order to prepare the new dyestuff, we proceed, for instance, as follows: 14.3 kilos alpha-naphthylamin are dissolved in five hundred liters of water and thirty kilos hydrochloric acid, and then after cooling with five hundred kilos of ice diazotized with 6.9 kilos sodium nitrite. The diazo solution so obtained is poured into a cold solution of 23.8 kilos 1.3.6 naphthylenediaminsulfo-acid and forty-two kilos sodium acetate in six hundred liters of water. As soon as the formation of the monoazo color is completed the intermediate product obtained in the usual manner from 18.4 kilos benzidin and 13.8 kilos salicylic acid is run into the reaction liquid. In order to hasten the combination, the liquid is rendered weakly alkaline. After about ten hours the mass is heated up and the dyestuff salted out, filtered, pressed, and dried.

The dyestuff formed in this manner represents a brown powder easily soluble in water, only very difficultly soluble in alcohol. The aqueous solution is yellowish red. The solution in concentrated sulfuric acid is pure blue, and on adding water to it the free acid of the coloring-matter separates out as a dark precipitate.

The new color dyes unmordanted cotton reddish-brown shades from baths prepared with alkali or salt. It dyes wool the same shades from a neutral bath and is especially suited for dyeing mixed goods.

What we claim is—

The new polyazo dyestuff derivable from 1.3.6 naphthylenediaminsulfo-acid in the manner hereinbefore described, which exists as a brown powder easily soluble in cold water, only very difficultly soluble in alcohol, giving a pure-blue solution with concentrated sulfuric acid, from which solution the free acid of the coloring-matter separates out on addition of water as a dark precipitate, and which dyes unmordanted cotton reddish-brown shades from baths prepared with alkali or salt, which dyes wool the same shades from a neutral bath and is especially suited for dyeing mixed goods.

In testimony whereof we have signed our names to this specification in the presence of two subscribing witnesses.

IGNAZ ROSENBERG.
     BRUNO HELMERT.

Witnesses:
 C. REINHARD,
 JACOB ADRIAN.